(12) United States Patent
Masselin et al.

(10) Patent No.: US 11,780,087 B2
(45) Date of Patent: Oct. 10, 2023

(54) METHOD FOR MOVING AN EXOSKELETON

(71) Applicant: WANDERCRAFT, Paris (FR)

(72) Inventors: Matthieu Masselin, Paris (FR); Marine Petriaux, Paris (FR)

(73) Assignee: WANDERCRAFT, Paris (FR)

( * ) Notice: Subject to any disclaimer, the term of this patent is extended or adjusted under 35 U.S.C. 154(b) by 539 days.

(21) Appl. No.: 16/620,723

(22) PCT Filed: Jun. 28, 2018

(86) PCT No.: PCT/FR2018/051586
§ 371 (c)(1),
(2) Date: Dec. 9, 2019

(87) PCT Pub. No.: WO2019/002772
PCT Pub. Date: Jan. 3, 2019

(65) Prior Publication Data
US 2020/0122326 A1     Apr. 23, 2020

(30) Foreign Application Priority Data

Jun. 29, 2017 (FR) ...................................... 1756007

(51) Int. Cl.
| | | |
|---|---|---|
| *B25J 9/16* | (2006.01) | |
| *A61G 5/14* | (2006.01) | |
| *B25J 9/00* | (2006.01) | |

(52) U.S. Cl.
CPC .............. *B25J 9/1664* (2013.01); *A61G 5/14* (2013.01); *B25J 9/0006* (2013.01); *B25J 9/1615* (2013.01)

(58) Field of Classification Search
CPC ......... A61G 5/14; B25J 9/1664; B25J 9/0006; B25J 9/1615; G05B 2219/40305
See application file for complete search history.

(56) References Cited

U.S. PATENT DOCUMENTS

2013/0150980 A1   6/2013   Swift et al.
2014/0142475 A1*  5/2014   Goldfarb ............... A61H 1/0262
                                                    601/35
(Continued)

FOREIGN PATENT DOCUMENTS

EP      1260201 A1    11/2002
EP      3025693 A1     6/2016
(Continued)

OTHER PUBLICATIONS

Mettin et al., "Motion planning for humanoid robots based on virtual constraints extracted from recorded human movements", Intelligent Service Robotics, vol. 1, No. 4, Jul. 3, 2008, pp. 289-301.*

(Continued)

*Primary Examiner* — Jeff A Burke
*Assistant Examiner* — Blake A Wood
(74) *Attorney, Agent, or Firm* — WOMBLE BOND DICKINSON (US) LLP

(57) ABSTRACT

A method for moving an exoskeleton from a seated position to a standing position (and vice versa) in which none of the degrees of freedom of the exoskeleton is non-actuated. The method includes the implementation by a data processor of steps of: (a) generating a trajectory of the exoskeleton from the seated position to the standing position (and vice versa), the trajectory being parameterised as a function of time; (b) applying to the trajectory a set of virtual constraints on the actuated degrees of freedom, the virtual constraints being parameterised by a phase variable; and (c) running a controller of the exoskeleton associated with the set of virtual constraints such that the exoskeleton moves from the seated position to the standing position (and vice versa), the controller being capable of generating commands for the actua- (Continued)

tors so as to comply with the virtual constraints during the trajectory.

14 Claims, 3 Drawing Sheets

(56) References Cited

U.S. PATENT DOCUMENTS

| 2014/0364962 | A1* | 12/2014 | Gregg | A61F 2/6607 |
| | | | | 623/24 |
| 2018/0116828 | A1* | 5/2018 | Quinn | B25J 9/0006 |

FOREIGN PATENT DOCUMENTS

| FR | 3061653 | A1 | 7/2018 |
| WO | 2010/044087 | A2 | 4/2010 |
| WO | 2015/140352 | A1 | 9/2015 |
| WO | 2015/140353 | A2 | 9/2015 |

OTHER PUBLICATIONS

R. D. Gregg, T. Lenzi, L. J. Hargrove and J. W. Sensinger, "Virtual Constraint Control of a Powered Prosthetic Leg: From Simulation to Experiments With Transfemoral Amputees," in IEEE Transactions on Robotics, vol. 30, No. 6, pp. 1455-1471, Dec. 2014, doi: 10.1109/TRO.2014.2361937.*

B. Griffin and J. Grizzle, "Nonholonomic virtual constraints for dynamic walking," 2015 54th IEEE Conference on Decision and Control (CDC), 2015, pp. 4053-4060, doi: 10.1109/CDC.2015.7402850.*

Agrawal et al., "First Steps Towards Translating HZD Control of Bipedal Robots to Decentralized Control of Exoskeletons", IEEE Access, 2017, 16 pages.

International Preliminary Report on Patentability received for PCT Patent Application No. PCT/FR2018/051586, dated Jan. 9, 2020, 15 pages (7 pages of English Translation and 8 pages of Original Document).

International Search Report and Written Opinion received for PCT Patent Application No. PCT/FR2018/051586, dated Nov. 20, 2018, 19 pages (8 pages of English Translation and 11 pages of Original Document).

Pchelkin et al., "A dynamic human motion: coordination analysis", Biological Cybernetics, Springer Verlag. Heidelberg, vol. 109, No. 1, Aug. 27, 2014, pp. 47-62.

Preliminary Research Report received for French Application No. 1756007, dated Mar. 20, 2018, 4 pages (1 page of French Translation Cover Sheet and 3 pages of original document).

* cited by examiner

ND FOR MOVING AN
EXOSKELETON

GENERAL TECHNICAL FIELD

The present invention relates to the field of exoskeleton type robots.

More specifically, it relates to a method for moving an exoskeleton.

PRIOR ART

Recently, for persons with significant mobility problems such as paraplegics, assisted walking devices called exoskeletons have appeared, which are external robotised devices that the operator (the human user) "slips on" thanks to a system of fasteners which links the movements of the exoskeleton with his own movements. The exoskeletons of lower limbs have several joints, generally at least at the level of the knees and the hips, to reproduce the walking movement. Actuators make it possible to move these joints, which in their turn make the operator move. An interface system allows the operator to give orders to the exoskeleton, and a control system transforms these orders into commands for the actuators. Sensors generally complete the device.

These exoskeletons constitute an advance compared to wheelchairs, because they allow operators to get back on their feet and to walk. Exoskeletons are no longer limited by wheels and can theoretically evolve in the majority of non-flat environments: wheels, unlike legs, do not make it possible to clear significant obstacles such as steps, stairs, obstacles that are too high, etc.

Human activities frequently involve going through a seated position: during meals, at work, in transports, being seated is a very common position. The use of the exoskeleton for paraplegics even provides in a majority of cases a transfer from the wheelchair to the exoskeleton, in seated position. The interest and even the possibility of the use of an exoskeleton thus greatly depends on its ability to stand up, i.e. to go from a seated position to a standing position.

In the patent applications WO2010044087, EP1260201 and US20130150980 it is thereby proposed to define "seated" and "standing" positions, and to provide algorithms for transiting between the two. More specifically, standing up is conditioned to the detection of a contact with the ground with foot sensors, and hip and knee sagittal motors are activated.

However, it is noted that this approach is simplistic and is far from enabling a comfortable movement and natural sensations. Indeed, the carrying out of the standing up movement in itself presents four challenges:

Armchairs, chairs, and other supports on which it is possible to sit down have a variety of shapes, dimensions. Furthermore, the installation positions are going to differ as a function of each user: what is practical for one user is not going to be for another. Similarly, the standing position must be different as a function of the users. Indeed, each has his own distribution of weight and thus specific balanced standing positions. Furthermore, some are going to prefer to be slightly rearward, with the knees more or less bent, etc. The ideal standing position even depends on what the user wishes to do after standing up. All of this contributes to the fact that the starting and arrival positions of the exoskeleton to make it stand up have to be adapted to each patient and to each case of use.

To enable the standing up movement, the feet of the patient have to remain on the ground throughout the duration of the movement. Thus, even knowing the seated position and the standing position, finding a movement going from one to the other while complying with the kinematic constraint on the feet is not trivial.

The seated positions generally have the legs very folded with a centre of pressure situated well behind the feet. The moment of the weight at the start of the movement is thus important, and requires considerable torques to succeed in reaching an extended posture. Standard controllers following a trajectory pre-calculated over time may aggravate this problem: if two joints do not have the same tracking quality, for example one is ahead of its trajectory and the other behind, the configuration may make the movement even more difficult. This is the case notably if the hips extend too quickly with respect to the knees—the pelvis is then sent considerably to the rear and exerts a very significant moment on the knees.

It is important to synchronise the movement of the top of the body of the patient (who is going for example to lean forward, or lean on the armrests, etc.) with the movement of the legs. If the patient has to adapt to the exoskeleton, the training phases become long and tiresome. The fact that the movement of the exoskeleton adapts to the movement of the top of the body of the patient makes it possible to reduce the training necessary for the patient. Furthermore, patients appreciate the fact of controlling the movement, of participating in carrying it out.

Consequently, it would be desirable to have available a novel technique of standing up from a seated position for exoskeletons which is free of the current constraints, and which is efficient, universal (makes it possible to stand up whatever the chair and the initial position of the user), comfortable and natural.

DESCRIPTION OF THE INVENTION

The present invention thus pertains, according to a first aspect, to a method for moving an exoskeleton accommodating a human operator, from a seated position to a standing position, said seated and standing positions being such that said exoskeleton has in said seated and standing positions a plurality of degrees of freedom each actuated by an actuator controlled by data processing means in such a way that no degree of freedom is non-actuated, the method being characterised in that it comprises the implementation by the data processing means of steps of:

(a) Generating a trajectory of the exoskeleton from said seated position to said standing position, said trajectory being parameterised as a function of time.

(b) Applying to said trajectory a set of virtual constraints on said actuated degrees of freedom, the virtual constraints being parameterised by a phase variable, (c) Running a controller of said exoskeleton associated with said set of virtual constraints such that the exoskeleton moves from the seated position to the standing position, said controller being capable of generating commands for said actuators so as to comply with said virtual constraints during said trajectory.

According to other advantageous and non-limiting characteristics:

the generation of a trajectory of the exoskeleton at step (a) is implemented when a request to stand up is received;

the request to stand up corresponds to a posture of said human operator;

a bust of the operator is equipped with a plurality of posture sensors, the request to stand up being detected as a function of the posture of said bust of the operator measured by the plurality of sensors;

step (a) comprises the determination of said seated position and/or said standing position;

step (a) comprises the identification of a temporary position taken by the exoskeleton during the reception of the request to stand up, and the determination of said seated position and said standing position from the temporary position;

said determined seated position and standing position are acceptable positions with respect to predetermined constraints;

said predetermined constraints comprise the fact of being in a stability state in which a Centre of Pressure, CoP, is within a sustentation surface of the exoskeleton and postural constraints;

step (b) comprises the prior selection of the phase variable;

in a database stored in data storage means are stored pairs of:
- a set of virtual constraints on said actuated degrees of freedom, the virtual constraints being parameterised by a phase variable,
- a controller of said exoskeleton associated with the set of virtual constraints;

step (b) comprising the identification of a set of constraints as a function of the chosen phase variable.

According to a second aspect, the invention relates to a method for moving an exoskeleton accommodating a human operator, from a standing position to a seated position, said seated and standing positions being such that said exoskeleton has in said seated and standing positions a plurality of degrees of freedom each actuated by an actuator controlled by data processing means in such a way that no degree of freedom is non-actuated, the method being characterised in that it comprises the implementation by the data processing means of steps of:

(a) Generating a trajectory of the exoskeleton from said standing position to said seated position, said trajectory being parameterised as a function of time.

(b) Applying to said trajectory a set of virtual constraints on said actuated degrees of freedom, the virtual constraints being parameterised by a phase variable, (c) Running a controller of said exoskeleton associated with said set of virtual constraints such that the exoskeleton moves from the standing position to the seated position, said controller being capable of generating commands for said actuators so as to comply with said virtual constraints during said trajectory.

According to a third aspect, the invention relates to an exoskeleton accommodating a human operator, comprising data processing means configured to implement:

A module for generating a trajectory of the exoskeleton from a seated position to a standing position such that said exoskeleton has in said seated and standing positions a plurality of degrees of freedom each actuated by an actuator controlled by the data processing means in such a way that no degree of freedom is non-actuated, said trajectory being parameterised as a function of time.

A module for applying to said trajectory a set of virtual constraints on said actuated degrees of freedom, the virtual constraints being parameterised by a phase variable, A module for running a controller associated with said set of virtual constraints such that the exoskeleton moves from the seated position to the standing position, said controller being capable of generating commands for said actuators so as to comply with said virtual constraints during said trajectory.

According to a fourth aspect, the invention relates to an exoskeleton accommodating a human operator, comprising data processing means configured to implement:

A module for generating a trajectory of the exoskeleton from a standing position to a seated position such that said exoskeleton has in said seated and standing positions a plurality of degrees of freedom each actuated by an actuator controlled by the data processing means in such a way that no degree of freedom is non-actuated, said trajectory being parameterised as a function of time.

A module for applying to said trajectory a set of virtual constraints on said actuated degrees of freedom, the virtual constraints being parameterised by a phase variable, A module for running a controller associated with said set of virtual constraints such that the exoskeleton moves from the standing position to the seated position, said controller being capable of generating commands for said actuators so as to comply with said virtual constraints during said trajectory.

According to fifth and sixth aspects, the invention relates to a computer programme product comprising code instructions for running a method for moving an exoskeleton according to the first or the second aspect of the invention; and a storage means that can be read by a computer equipment on which a computer programme product comprises code instructions for running a method for moving an exoskeleton according to the first or the second aspect of the invention.

DESCRIPTION OF THE FIGURES

Other characteristics and advantages of the present invention will become clear on reading the description that follows of a preferential embodiment. This description will be given with reference to the appended drawings in which.

DETAILED DESCRIPTION

Architecture

Figure 1:
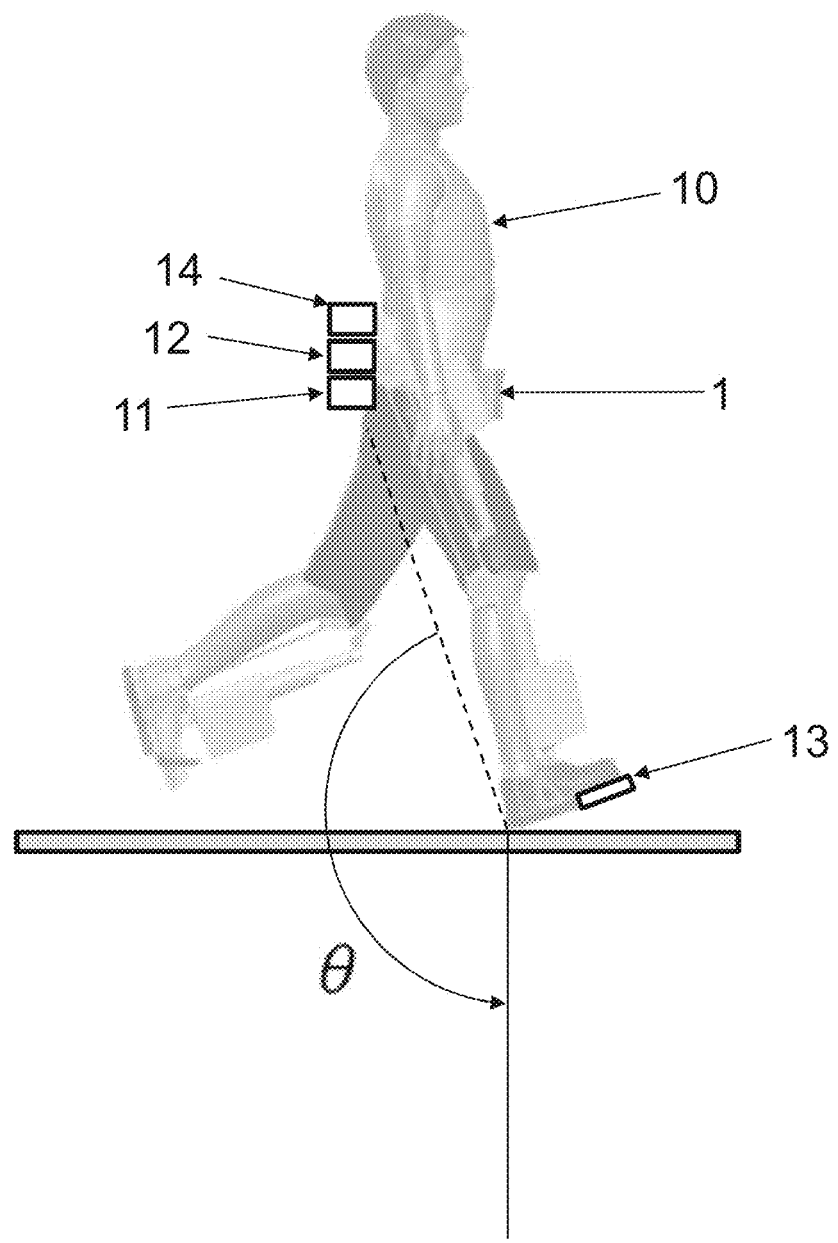
FIG. 1 is an outline of an exoskeleton (of exoskeleton type) for the implementation of the method according to the invention.

With reference to FIG. 1, the present method is a method for making stand up an exoskeleton 1, i.e. an articulated mechanical system of a biped robotised type device, actuated and commanded, provided with two legs, accommodating more specifically a human operator having his lower limbs each integral with a leg of the exoskeleton 1 (notably thanks to straps). It may thus be a more or less humanoid robot.

The exoskeleton 1 comprises on each leg a foot structure comprising a support plane on which a foot of a leg of the person wearing the exoskeleton can be supported when the foot is flat.

"Stand up" is here taken to mean the movement of the exoskeleton 1 so as to go from a seated position to a standing position. These terms here have their natural signification. More specifically, seated position is taken to mean a position in which the operator equipped with the exoskeleton rests on a seat, i.e. is supported at the level of his "rear". As will be seen, an "acceptable" seated position will generally be chosen, in particular in which both feet of the exoskeleton are laid on the ground, and flat. In the standing position, the operator rests uniquely on his two legs, preferentially extended, which signifies that there are no other support points than the two feet. As for the seated position, it generally involves a position in which the two feet of the exoskeleton are laid on the ground, and flat. In one as in the other of the seated and standing positions, the exoskeleton must be in a stability state, that is to say that the operator may remain static without falling.

Stability state is advantageously taken to mean a state in which a CoM (Centre of Mass) is within a sustentation surface of the exoskeleton 1. The CoM coincides with stoppage with a ZMP (Zero Moment Point) and designates more specifically the point where the moment of the contact forces has two of its three coordinates zero (purely vertical).

The exoskeleton 1 has a plurality of degrees of freedom, that is to say deformable joints (generally via a rotation) that is to say moveable with respect to each other, which are each either "actuated" or "non-actuated".

An actuated degree of freedom designates a joint provided with an actuator controlled by data processing means 11, that is to say that this degree of freedom is controlled and that it is possible to act upon. Conversely, a non-actuated degree of freedom designates a joint not provided with an actuator, that is to say that this degree of freedom follows its own dynamic and that the data processing means 11 do not have direct control of it (but a priori an indirect control via the other actuated degrees of freedom). In the example of FIG. 1, the heel-ground contact is punctual, and the exoskeleton 1 is thereby free in rotation with respect to this contact point. The angle between the heel-hip axis and the vertical then constitutes a non-actuated degree of freedom.

In the present case, and it will be seen why hereafter, said seated and standing positions are such that said exoskeleton 1 has in these positions no degree of freedom that is non-actuated, that is to say that the system is not sub-actuated (the degree of sub-actuation, i.e. the number of non-actuated degrees of freedom, is equal to zero which signifies that the evolution of the system is totally determined).

This explains why the seated and standing positions usually require having both feet laid on the ground and flat: the heel-ground contact is no longer punctual, and the angle between the heel-hip axis and the vertical then no longer constitutes a non-actuated degree of freedom of the exoskeleton 1 for lack of free rotation. It will however be understood that the present invention is not limited to seated and standing positions with both feet on the ground and flat because the only condition necessary is to have no non-actuated degree of freedom, and it is possible to find positions (in particular seated) which are entirely actuated even though one foot is not laid down flat.

The data processing means 11 designate a computer equipment (typically a processor, either external if the exoskeleton 1 is "remotely controlled" but preferentially embedded in the exoskeleton 1) suited to processing instructions and generating commands intended for the different actuators. Said actuators may be electric, hydraulic, etc.

The present application will not be limited to any exoskeleton architecture 1, and the example such as described in the applications WO2015140352 and WO2015140353 will be taken.

Those skilled in the art will however know how to adapt the present method to any other mechanical architecture.

Dynamic

Traditionally, the trajectories, that is to say the evolutions of each degree of freedom are expressed as a function of time. The "dynamic" of the system is defined by a function $f: \chi \times \mathcal{U} \times \mathbb{R}^+ \mapsto \chi$ and a starting point $\xi \times \chi$ the function $f$ being written $\dot{x}_t = f(x_t, u_t, t)$, $x_0 = \xi$, $\chi$ being the state space of the exoskeleton 1 and $\mathcal{U}$ the control space, t representing time.

In the so-called "virtual constraints" method, the principle is to define for a selection of actuated degrees of freedom a trajectory parameterised by a parameter of evolution not in time, but directly as a function of the configuration, this parameter being designated phase variable. An example of such a phase variable is represented in FIG. 1, it is the angle between the heel-hip axis and the vertical which then constitutes a non-actuated degree of freedom mentioned above.

The virtual constraints method is well known, and is normally applied to a movement in which at least one degree of freedom is non-actuated, in particular walking, as proposed for example in the application FR1750217.

The phase variable makes it possible in such a case to define "the progress" of a step. More specifically, at each step, the phase variable goes continually from an initial value to a final value, before being reassigned the initial value: this is the start of the following step. To facilitate things, it is possible to normalise the value of the phase parameter between 0 and 1.

Figure 2:
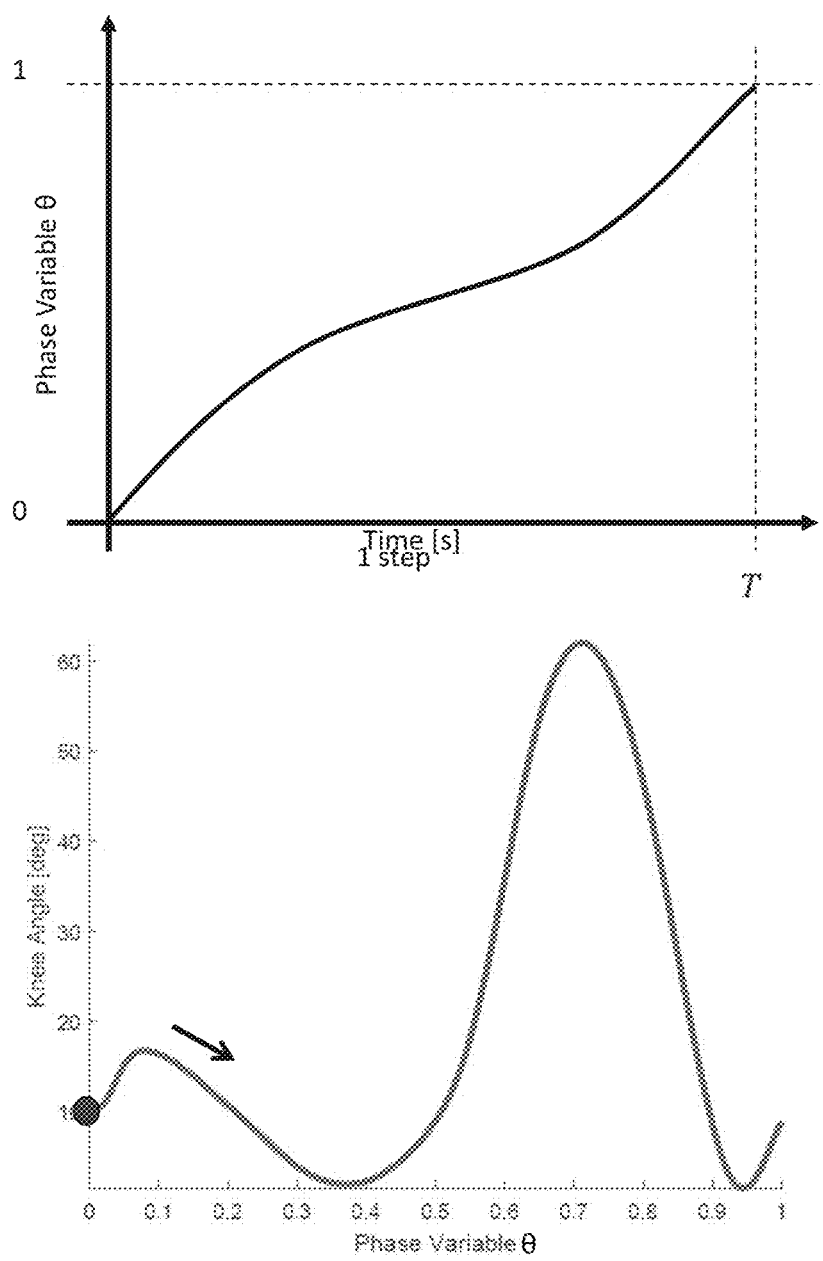
FIG. 2 represents an example of evolution of a phase variable, and evolution of a degree of freedom actuated as a function of this phase variable.

Each value of the evolution parameter corresponds to a value of the actuated degrees of freedom that the system must endeavour to follow: it is these relations (one for each actuated degree of freedom that it is wished to control in this way) that are known as virtual constraints. FIG. 2 shows the operation of the virtual constraints for a joint, the knee.

If the system exactly follows this trajectory for the degrees of freedom on which it is possible or it is wished to act, in other words if the virtual constraints are complied with for these degrees of freedom, then the evolution of the system is totally determined by that of the non-actuated degrees of freedom which follow their own dynamic.

This dynamic is called Hybrid Zero Dynamics (HZD), because:
  it is designated "Zero" since it corresponds to the degrees on which the command cannot/does not wish to act, i.e. the command is equal to 0;
  it is designated "Hybrid" because the impact of the foot on the ground imposes instantaneous discontinuous phases that intersect the continuous phases.

The present method for making an exoskeleton 1 stand up uses in an unexpected manner the virtual constraints method even though all the degrees of freedom are actuated and the movement is non-cyclic (it does not involve a step), and thus that the HZD is inapplicable.

During a walking movement, the introduction of a phase variable is a way of adapting to the sub-actuation of the system. During the standing up movement, the system is entirely actuated, but the difficulty is to coordinate the bust of the patient and the different joints of the exoskeleton, of which some do not move as quickly as expected due to saturations of the engine torque, unexpected movements of the user or yet other perturbations.

The Applicant has thus noticed that by choosing a suitable phase variable, and a fortiori a phase variable different from those used for walking (a good phase variable for walking is not always a good phase variable for standing up: a monotonous variable while walking is not necessarily monotonous while standing up), then the virtual constraints method would make it possible in a surprising manner to synchronise easily the standing up movement, and thus to avoid that the joints bend too quickly, so as to run it exactly at the speed desired by the operator with substantially enhanced usability and comfort.

Phase variables will notably be taken for which the user has direct control at his disposal. For example, the position of the knee or the angle of the bust will be cited.

Method

The present method begins by a step (a) of generating a trajectory of the exoskeleton 1 from said seated position to said standing position, said trajectory being parameterised as a function of time. This step is preferentially implemented when a request to stand up is received.

In this respect, step (a) advantageously comprises the detection that the operator wishes to stand up, so as to generate said request to stand up.

Indeed, if the exoskeleton 1 is an exoskeleton accommodating a human operator, it is the posture of said human operator that determines his intentions (unlike the case of a normal robot which can directly receive a standardised request to stand up). It is thus necessary to make the difference between a simple movement of the operator on his chair (for example turning to look left while remaining seated) and the movement to a standing position.

To do so, the operator may be provided with a vest of sensors 10 making it possible to detect the configuration of his bust (orientation thereof). The request to stand up may correspond to a particular posture of the operator, for example leaning forwards, signifying his intention to initiate a movement from a seated position to a standing position, and thus ordering the data processing means to implement step (a). This start-up algorithm may be based on pre-calculated parameterised movements and tested upstream or on sensor referenced movements, for example, means for detecting the impact of the feet on the ground 13 and/or inertial measurement means 14 equipped on the exoskeleton 1. Alternatively, the request to stand up may correspond to the pressing by the operator on a button.

Figure 3:
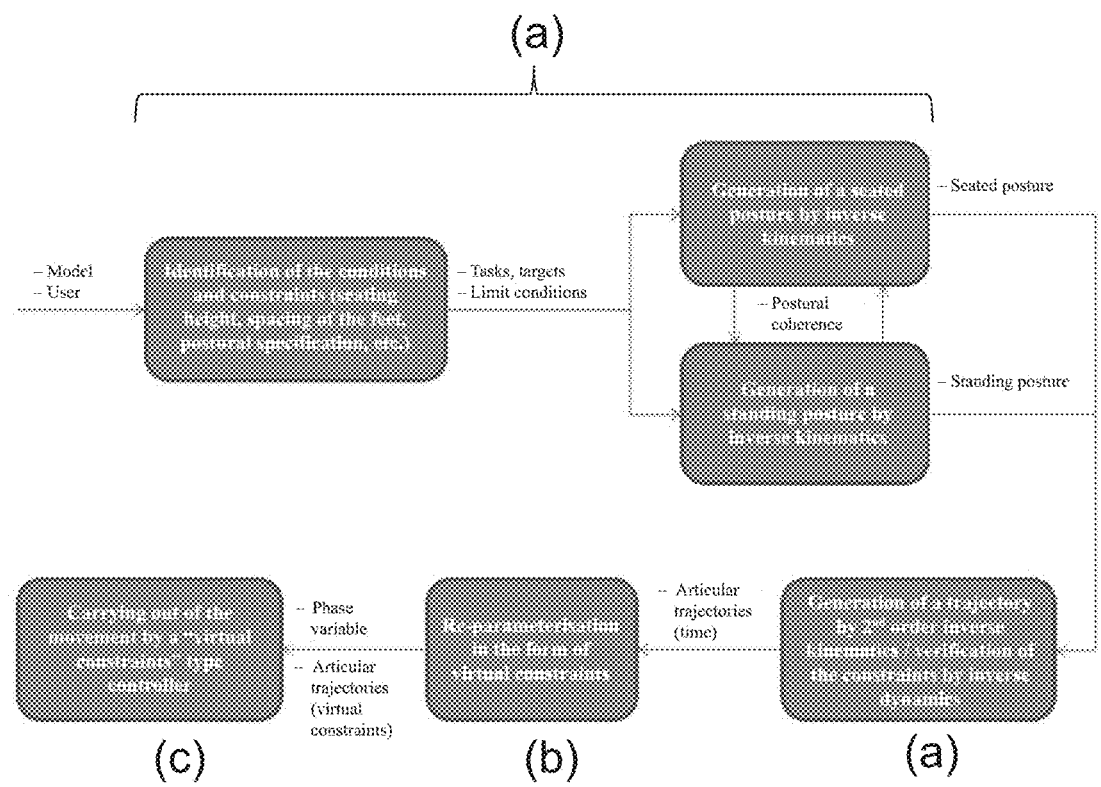
FIG. 3 is a diagram illustrating a preferred embodiment of the method according to the invention.

Following this reception of a request to stand up, with reference to FIG. 3, step (a) may comprise a prior sub-step of generation of the seated position and/or the standing position. This sub-step is optional since these positions may be directly available (in particular, the operator can find himself already in an acceptable seated position at the moment of the initiation of the movement, and the target standing position may be provided in advance).

Starting from a "temporary" seated position corresponding to that taken during the reception of the request to stand up, a "starting" seated position is advantageously determined which is the acceptable seated position which will be used by the present method (that from which the movement to the standing position will be implemented, it should be noted that in the remainder of the present description "seated position" will be taken to mean an acceptable seated position and in particular said starting seated position).

More specifically, the "acceptable" seated and standing positions are a position in which as explained all the degrees of freedom are actuated (typically feet on the ground), preferentially with respect to constraints of which a stability constraint (CoP above supports), postural constraints such as articular amplitudes, torques, etc., and constraints defined by the temporary position such as seating height (for the seated position only), the spacing of the feet, the orientation of the pelvis, etc. It should be noted that conversely certain constraints such as the spacing of the feet or the orientation of the pelvis may be redefined with respect to the temporary position if their values do not enable a correct trajectory.

The determination of one or the other of the acceptable seated or standing positions may be accomplished by inverse kinematics with definition of corresponding tasks.

The seated position and the standing position preferentially share a postural coherence, for example the same position of the feet (which signifies that it is uniquely the rest of the exoskeleton 1 which moves), so as to guarantee that throughout the movement all the degrees of freedom are kept actuated.

Thus, in a particularly preferred manner, step (a) comprises immediately after the reception of the request to stand up the identification of a seated temporary position. From there, the associated constraints which are going to serve as basis for the determination of the acceptable seated and standing positions (seating height, spacing apart of the feet, postural specifications, etc.) are calculated using a model of the operator and the exoskeleton 1, which may be pre-generated from measurements specific to the operator (distances between joint centres, weight, size).

The seated (starting) and standing positions are then determined thanks to said constraints, while searching for the postural coherence. The trajectory as a function of time connecting them may then be determined.

The trajectory determination of step (a) between the seated and standing positions may be performed in numerous known manners, for example by second order inverse kinematics.

A dynamic trajectory making it possible to link one position with another is defined in particular by the positions/speeds/accelerations as a function of time for all the joints with compliance with the potential system constraints mentioned above: articular amplitudes, speeds, available torques, feet that remain on the ground, etc.

Step (a) thereby makes it possible in a simple manner to ensure that the trajectory is feasible and to take into account the potential torques, articular constraints, etc.

In a step (b), the temporal trajectory is passed into virtual constraints. More specifically, a set of virtual constraints on said actuated degrees of freedom is applied to said trajectory, the virtual constraints being parameterised by a phase variable.

This step (b) may comprise the prior selection of said phase variable. As explained, a variable is needed of which the evolution is monotonous during the movement, and measurable. It is preferable that the operator can act on the evolution of this variable, in order that he controls the running of the movement. This passage to the virtual constraints avoids as already mentioned the joints unbending too quickly, hence the substantial increase in comfort.

For a given set of virtual constraints the "constrained" state space is a topological variety of the dynamic in which each point is defined by the value of the phase parameter (and if needs be derivatives thereof).

The set of virtual constraints is associated with a controller capable of generating commands for said actuators so as to comply with said virtual constraints during a trajectory.

It should be noted that a plurality of sets of constraints may be available, corresponding to different phase variables, or quite simply different seating heights or standing up speeds.

In this respect, the present method advantageously proposes the use of a database (called control library) stored in data storage means 12 (a memory connected to the data processing means 11) of at least one pair of:
- a set of virtual constraints on said actuated degrees of freedom, the virtual constraints being parameterised by a phase variable,
- a controller of said exoskeleton 1 (associated with the set of virtual constraints) capable of generating commands for said actuators so as to comply with said virtual constraints by implementing at least one stable trajectory.

Those skilled in the art will know how to generate them. Step (b) may thus comprise the identification of the pair of a set of virtual constraints and a controller, in particular as a function of the selected phase variable.

In a final step (c), said controller of said exoskeleton 1 is run associated with the set of virtual constraints (if needs be identified) such that the exoskeleton 1 moves from the seated position to the standing position.

More specifically, the controller applies the trajectory parameterised as a function of the phase variable: thanks to the controller at each instant the phase variable and the position and speed set points of each joint actuated as a consequence are calculated.

It should be noted that in the case where an acceptable seated position different from the temporary position must be determined, step (c) must include the passage to this acceptable seated position before running the controller. However, this is generally close to the temporary position taken by the exoskeleton at the start-up of the method.

In practice, these are two seated positions having common conditions such as the seating height. The temporary position is often with legs semi-extended, whereas the acceptable seated position has the legs more folded to pass the feet under the seat.

This solution proves to be particularly efficient, because all the complexity of standing up is carried out upstream. In operation, the controller of the exoskeleton just has to apply the trajectory obtained to obtain a comfortable and natural standing up movement, whatever the configuration.

From there, a method for moving (walking) can take over, in particular that such as defined for example in the application FR1750217, using new sets of virtual constraints and controllers this time of HZD type (due to the existence of non-actuated degrees of freedom during walking).

It should be noted that an "opposite" method for moving the exoskeleton 1 from a standing position to a seated position (i.e. to sit down instead of to stand up) may be implemented in a similar manner.

This second method is based on the same principle, it is identical to the first method while inverting the seated and standing positions: it comprises the implementation by the data processing means 11 of steps of:
(a) Generating a trajectory of the exoskeleton 1 from said standing position to said seated position, said trajectory being parameterised as a function of time.
(b) Applying to said trajectory a set of virtual constraints on said actuated degrees of freedom, the virtual constraints being parameterised by a phase variable,
(c) Running a controller of said exoskeleton 1 associated with said set of virtual constraints such that the exoskeleton 1 moves from the standing position to the seated position, said controller being capable of generating commands for said actuators so as to comply with said virtual constraints during said trajectory.

Those skilled in the art will know how to transpose the steps of determining the acceptable standing and seated positions, and all the embodiments of the first method (to stand up) could be adapted to the second method (to sit down).

Equipment and System

According to other aspects, the invention relates to the exoskeleton 1, in particular of exoskeleton type, for the implementation of the method according to the first aspect (standing up) and/or the second aspect (sitting down).

As explained, the exoskeleton 1 comprises data processing means 11 and data storage means 12 (optionally external), and if necessary inertial measurement means 14 (inertial unit) and/or means for detecting the impact of the feet on the ground 13 (contact sensors or optionally pressure sensors).

It has a plurality of degrees of freedom of which at least one degree of freedom actuated by an actuator controlled by the data processing means 11, and in particular in said seated and standing positions a plurality of degrees of freedom is each actuated by an actuator controlled by the data processing means 11 in such a way that no degree of freedom is non-actuated.

The data processing means 11 are configured to implement:
- A module for generating a trajectory of the exoskeleton 1 from a seated position to a standing position (and/or from a standing position to a seated position) such that said exoskeleton 1 has in said seated and standing positions a plurality of degrees of freedom each actuated by an actuator controlled by the data processing means 11 in such a way that no degree of freedom is non-actuated, said trajectory being parameterised as a function of time.
- A module for applying to said trajectory a set of virtual constraints on said actuated degrees of freedom, the virtual constraints being parameterised by a phase variable,
- A module for running a controller associated with said set of virtual constraints such that the exoskeleton 1 moves from the seated position to the standing position (and/or from the standing position to the seated position), said controller being capable of generating commands for said actuators so as to comply with said virtual constraints during said trajectory.

Computer Programme Product

According to fifth and sixth aspects, the invention relates to a computer programme product comprising code instructions for the running (on the processing means 11) of a method for moving an exoskeleton 1 according to the first or the second aspect of the invention, as well as storage means that can be read by a computer equipment (for example the data storage means 12) on which is found this computer programme product.

The invention claimed is:

1. Method for moving an exoskeleton accommodating a human operator, said exoskeleton having a plurality of degrees of freedom, the method comprising executing by a data processor the steps of:
Determining a starting position and a finish position such that, in each of said starting and finish positions, each degree of freedom is actuated by an actuator controlled by the data processor and none of the degrees of freedom is non-actuated, one of the starting and finish positions being a seated position, the other of the starting and finish positions being a standing position, (a) generating a trajectory of the exoskeleton from said starting position to said finish position, said trajectory being derived from the starting position and finish position and parameterised as a function of time, (b) applying to said trajectory a set of virtual constraints on said actuated degrees of freedom, the virtual constraints being parameterised by a phase variable, (c) running a controller of said exoskeleton associated with said set of virtual constraints such that the exoskeleton moves from the starting position to the finish position, said controller generating commands for said actuators so as to comply with said virtual constraints during said trajectory.

2. Method according to claim 1, wherein the generation of a trajectory of the exoskeleton at step (a) is performed when a specific request is received.

3. Method according to claim 2, wherein the specific request corresponds to a posture of said human operator.

4. Method according to claim 3, wherein a bust of the operator is equipped with a plurality of posture sensors, the specific request to being detected as a function of the posture of said bust of the operator measured by the plurality of sensors.

5. Method according to claim 1, wherein the data processor further executes the steps of identifying a temporary position to ken by the exoskeleton when a request to stand up is received, said starting position and said finish position being derived from the temporary position.

6. Method according to claim 1, wherein the starting position and finish position are acceptable positions with respect to predetermined constraints.

7. Method according to claim 6, wherein said predetermined constraints include a stability state in which a Centre of Pressure, CoP, is within a sustentation surface of the exoskeleton and postural constraints.

8. Method according to claim 1, wherein step (b) comprises the prior selection of the phase variable.

9. Method according to claim 8, wherein in a data base stored in a data storage unit a restored pairs of:—a set of virtual constraints on said actuated degrees of freedom, the virtual constraints being parameterised by a phase variable,—a controller of said exoskeleton associated with the set of virtual constraints; wherein step (b) comprises the identification of the set of virtual constraints as a function of the chosen phase variable.

10. A non-transitory storage means on which a computer program product comprises code instructions for the execution of a method according to claim 1 for moving the exoskeleton.

11. Method according to claim 1, wherein the trajectory is such that all degrees of freedom are kept actuated throughout the movement from the starting position to the finish position.

12. Method according to claim 1, wherein the phase variable includes the position of the knee or the angle of the bust.

13. Method according to claim 1, wherein the trajectory is further derived from at least one system constraint comprising at least one of: a maximum articular amplitude, a maximum speed, a maximum torque.

14. Exoskeleton for accommodating a human operator, having a plurality of degrees of freedom and comprising a data processor configured to implement:

a module for determining a starting position and a finish position such that, in each of said starting and finish positions, each degree of freedom is actuated by an actuator controlled by the data processor and none of the degrees of freedom is non-actuated, one of the starting and finish positions being a seated position, the other of the starting and finish positions being a standing position, a module for generating a trajectory of the exoskeleton from said starting position to said finish position, said trajectory being derived from the starting position and finish position and parameterised as a function of time, a module for applying to said trajectory a set of virtual constraints on said actuated degrees of freedom, the set of virtual constraints being parameterised by a phase variable, a module for running a controller associated with said set of virtual constraints such that the exoskeleton moves from the starting position to the finish position, said controller being capable of genera ting commands for said actuators so as to comply with said set of virtual constraints during said trajectory.

* * * * *